Figure 1:
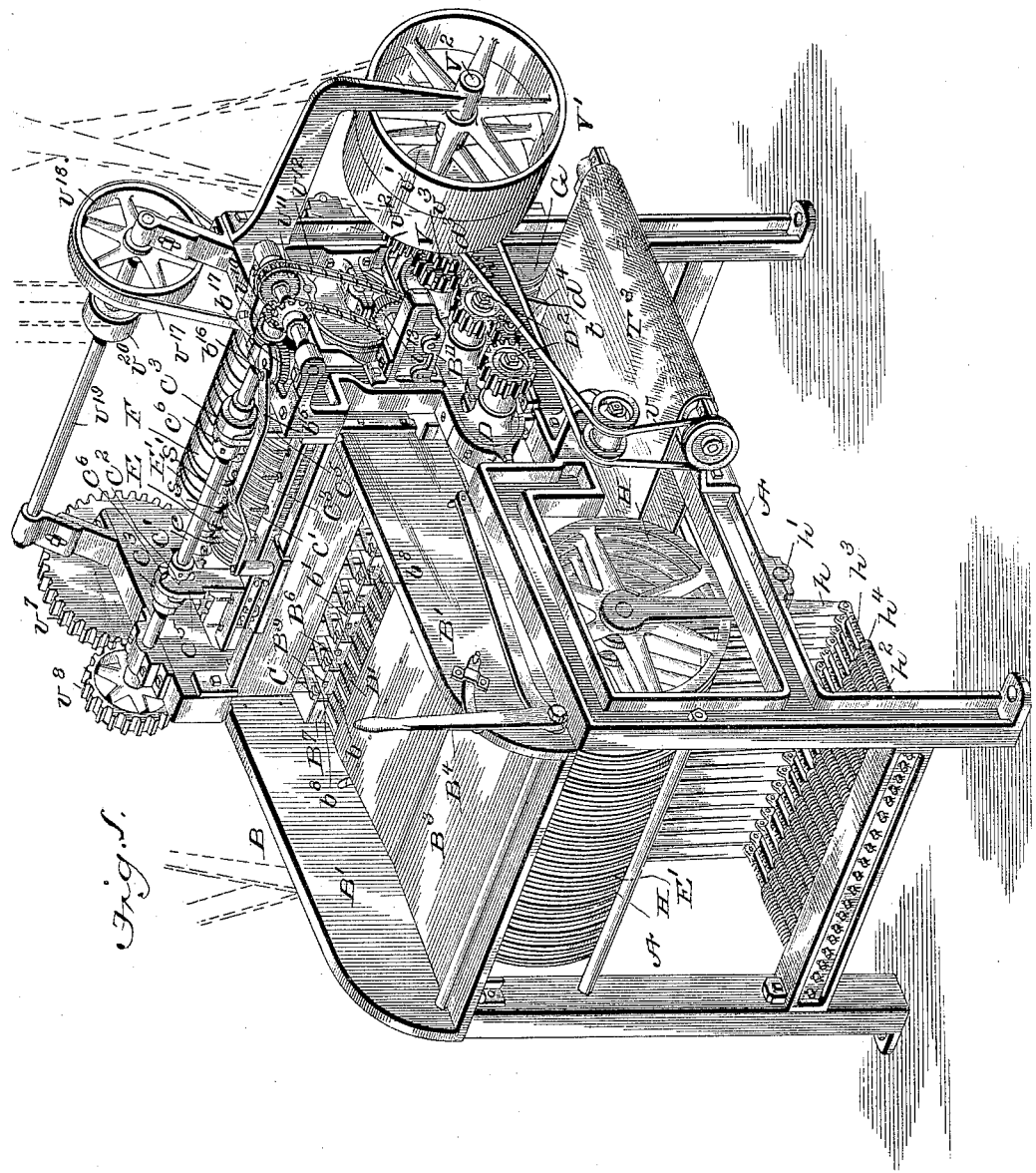

(No Model.)  13 Sheets—Sheet 1.
R. W. COFFEE.
TOBACCO STEMMING MACHINE.

No. 599,308. Patented Feb. 15, 1898.

Witnesses
Inventor
Robert W. Coffee
his Attorneys (No Model.) 13 Sheets—Sheet 5.

R. W. COFFEE.
TOBACCO STEMMING MACHINE.

No. 599,308. Patented Feb. 15, 1898.

Witnesses
J. M. Lowrie
Thomas Durant

Inventor
Robert W. Coffee
by Clench & Clench
his Attorneys (No Model.)  13 Sheets—Sheet 6.

R. W. COFFEE.
TOBACCO STEMMING MACHINE.

No. 599,308.  Patented Feb. 15, 1898.

Witnesses

Inventor
Robert W. Coffee
by Clench & Clench
his Attorneys (No Model.)  13 Sheets—Sheet 7.
R. W. COFFEE.
TOBACCO STEMMING MACHINE.
No. 599,308.  Patented Feb. 15, 1898.
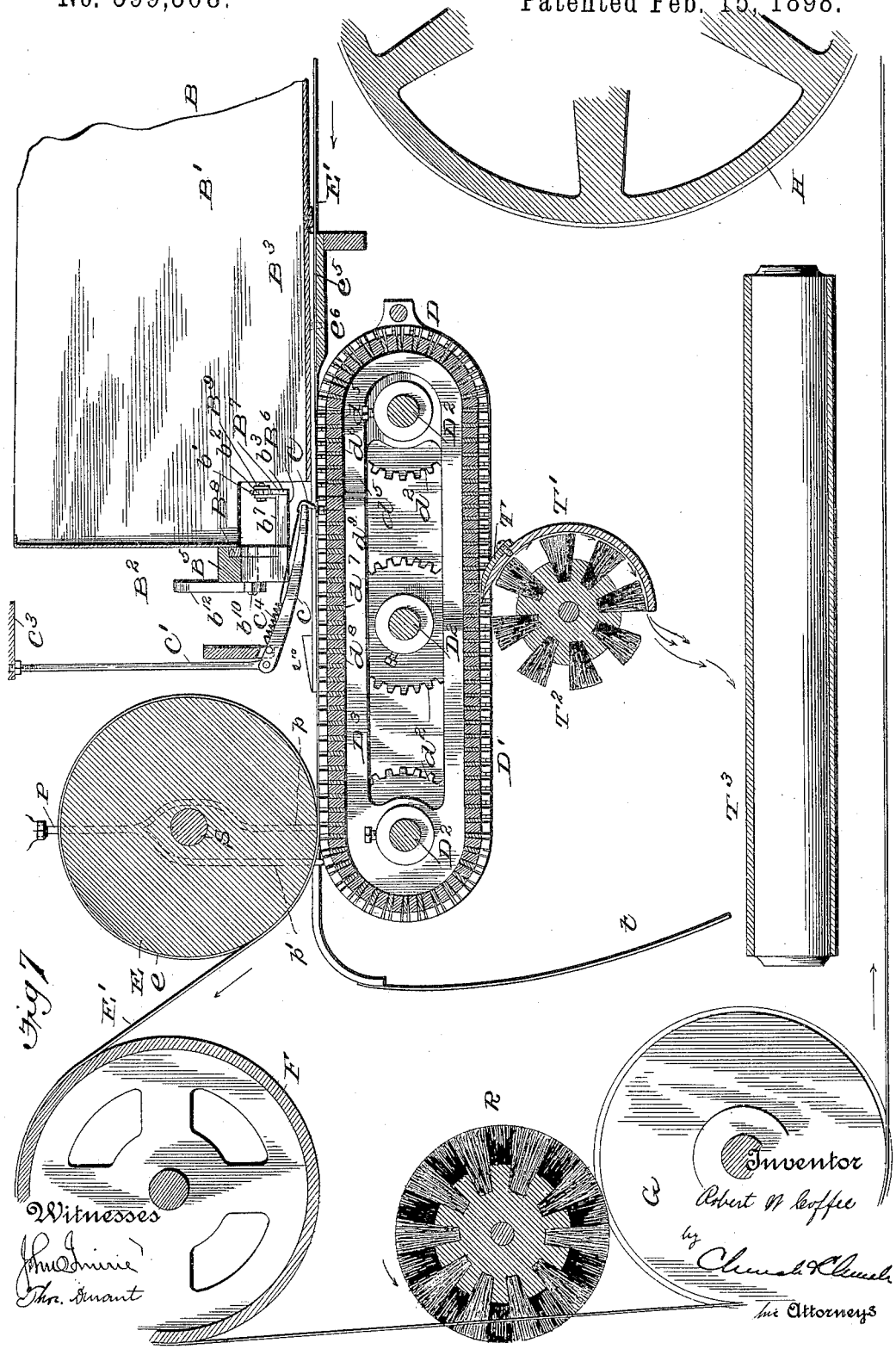

(No Model.) 13 Sheets—Sheet 8.
R. W. COFFEE.
TOBACCO STEMMING MACHINE.
No. 599,308. Patented Feb. 15, 1898.
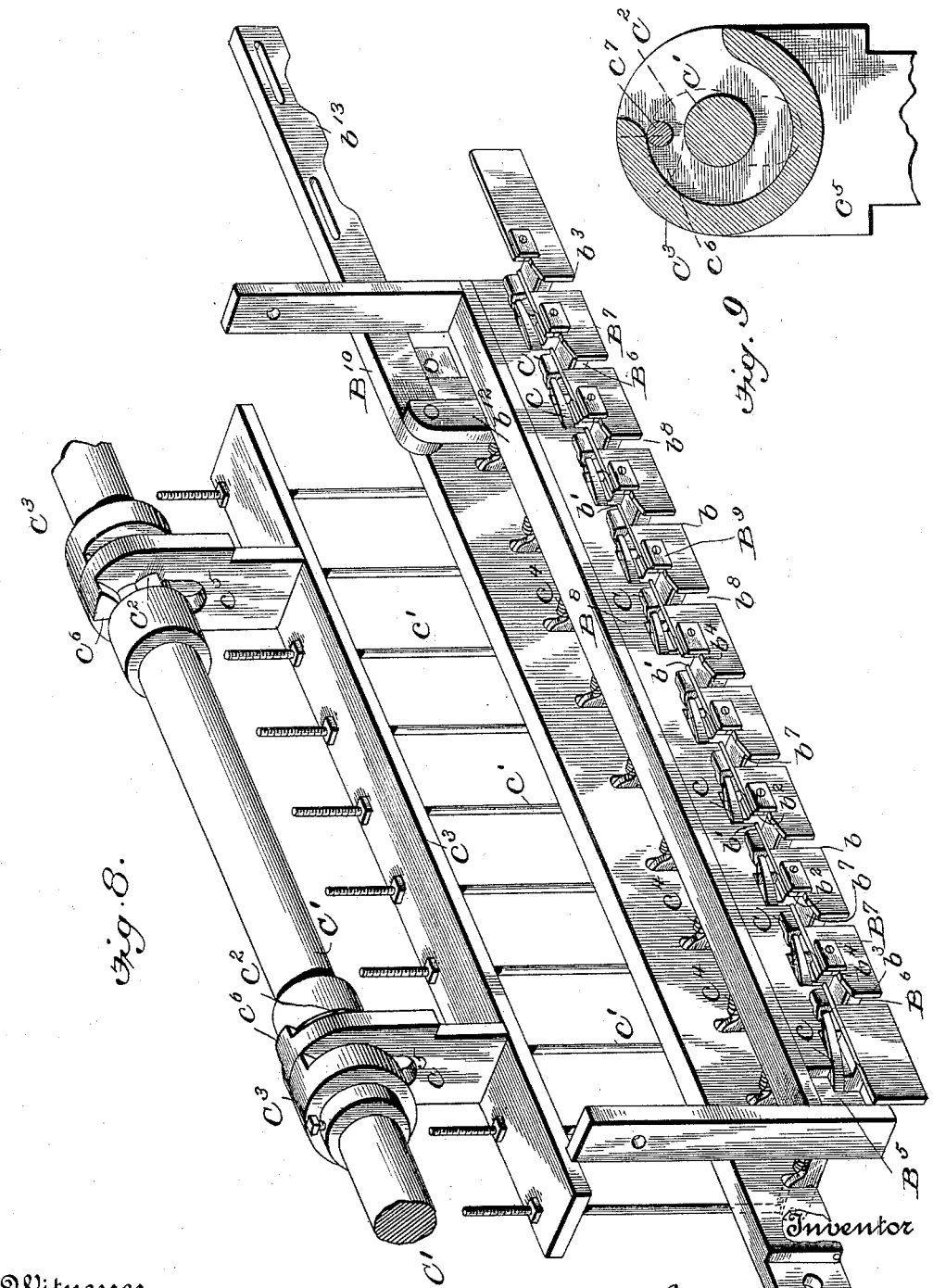

(No Model.) 13 Sheets—Sheet 9.
R. W. COFFEE.
TOBACCO STEMMING MACHINE.
No. 599,308. Patented Feb. 15, 1898.
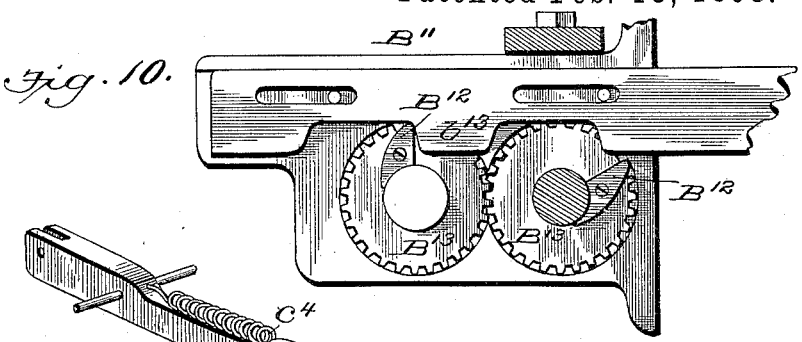
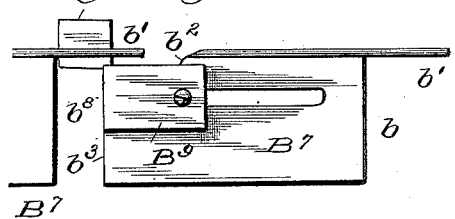
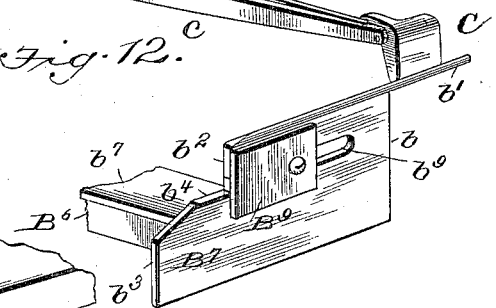
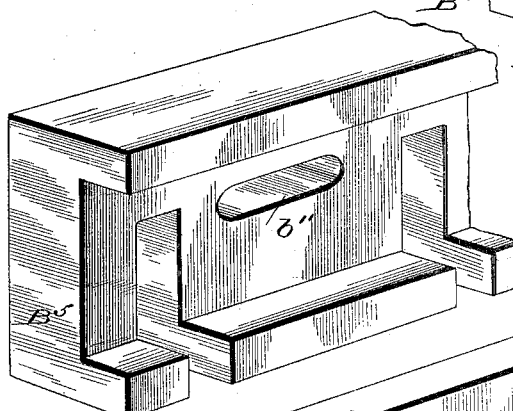
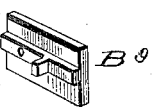
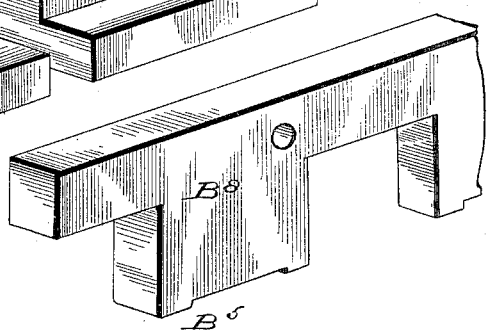
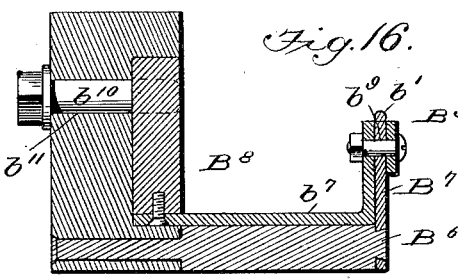
Witnesses
Inventor
Robert W. Coffee
his Attorneys

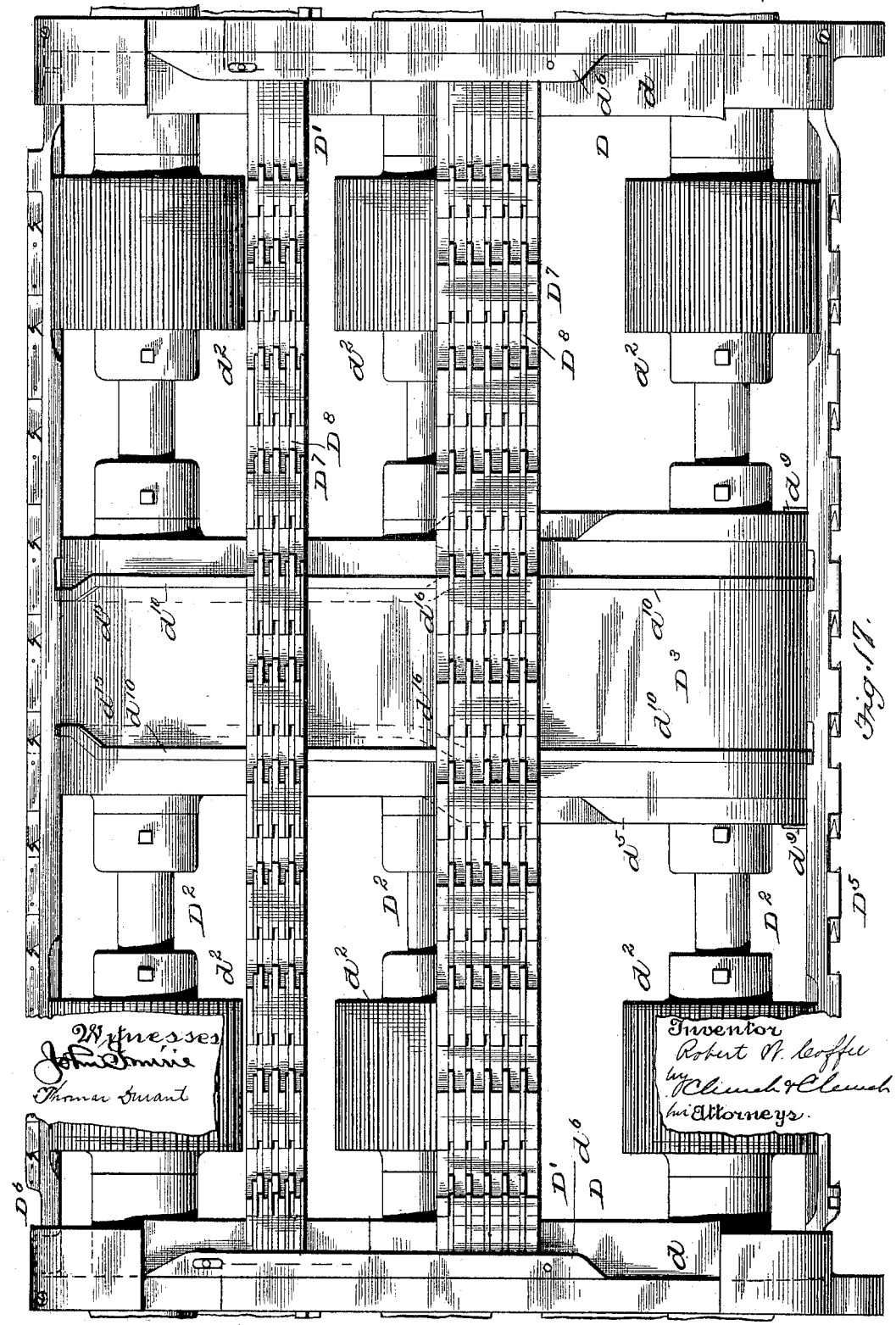

(No Model.) 13 Sheets—Sheet 11.
R. W. COFFEE.
TOBACCO STEMMING MACHINE.
No. 599,308. Patented Feb. 15, 1898.
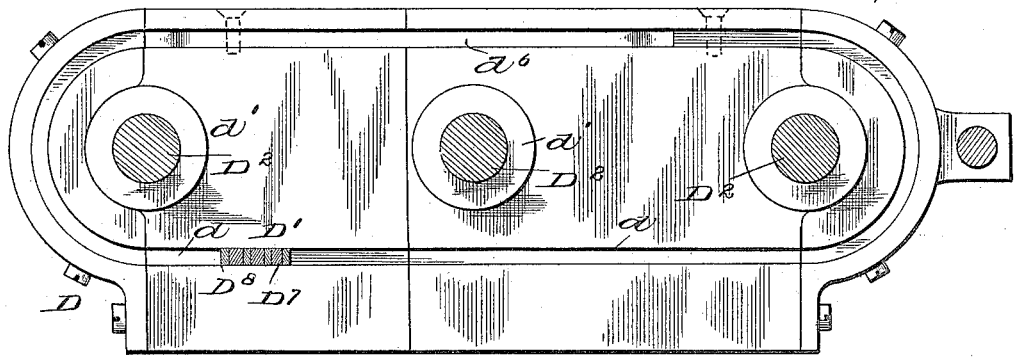
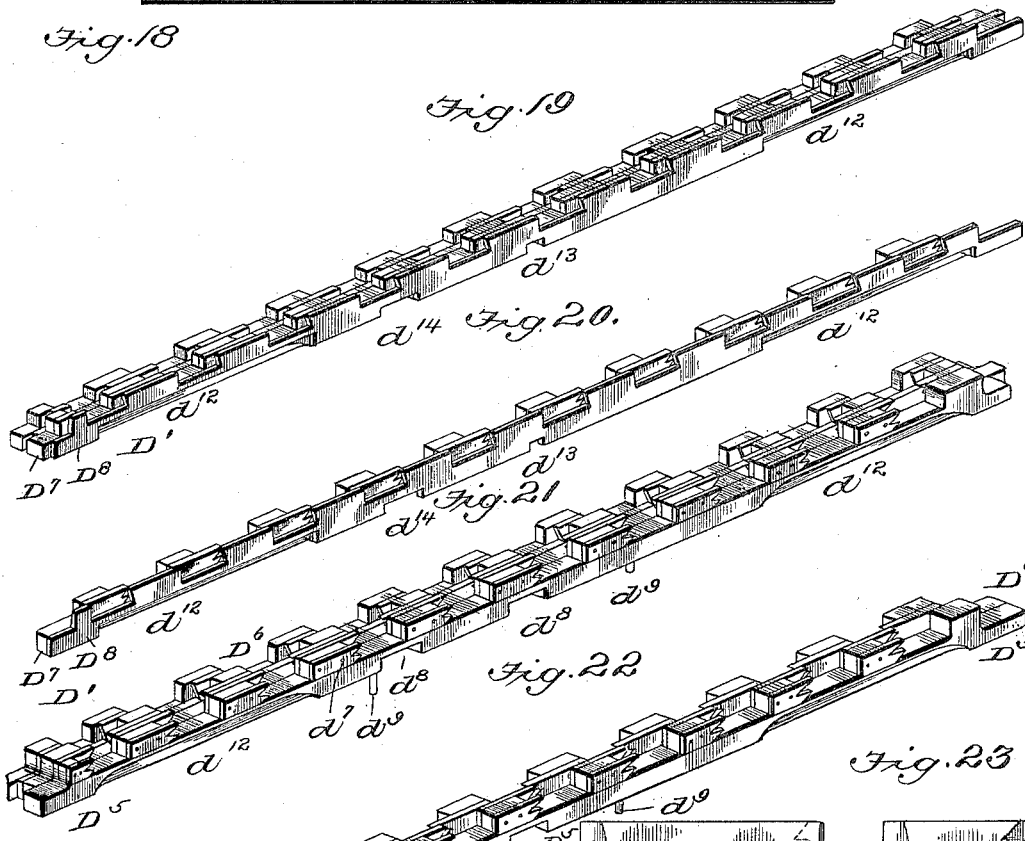
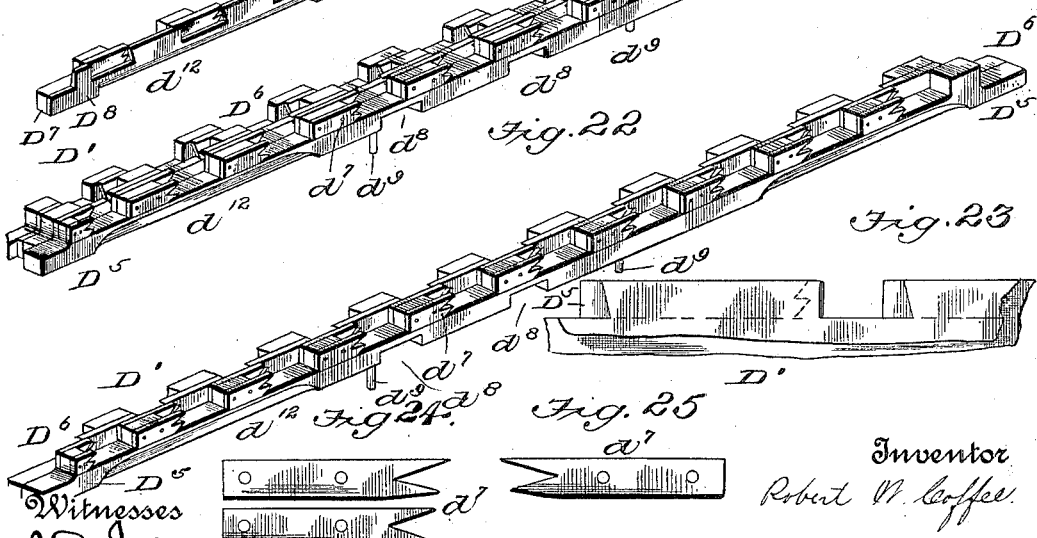
Witnesses
Inventor
Robert W. Coffee.
his Attorneys (No Model.) 13 Sheets—Sheet 12.
R. W. COFFEE.
TOBACCO STEMMING MACHINE.
No. 599,308. Patented Feb. 15, 1898.
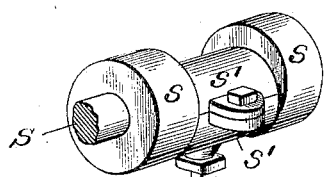
Fig. 28.
Fig. 26.
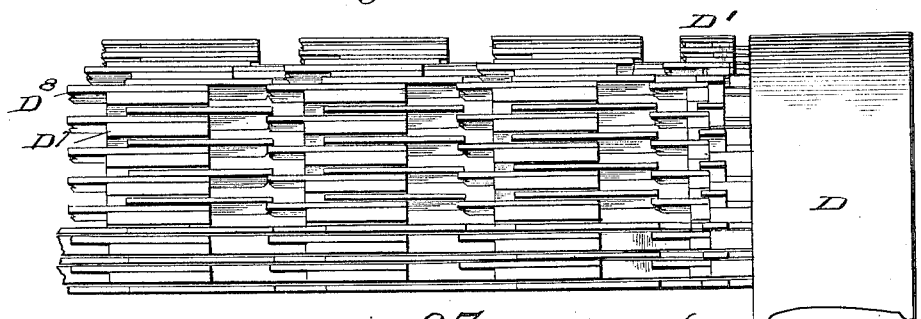
Fig. 27.
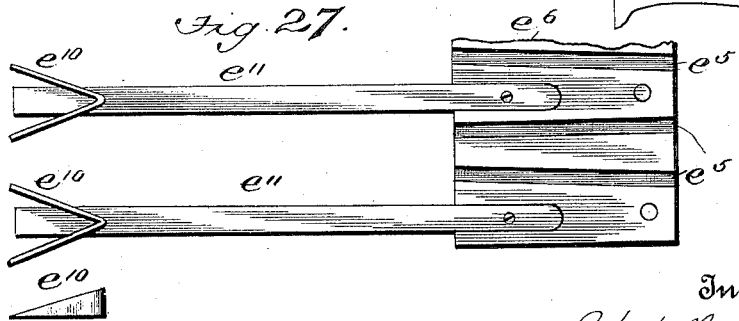
Witnesses
Inventor
Robert W. Coffee
by Clench & Clench
his Attorneys (No Model.)
13 Sheets—Sheet 13.
R. W. COFFEE.
TOBACCO STEMMING MACHINE.
No. 599,308. Patented Feb. 15, 1898.
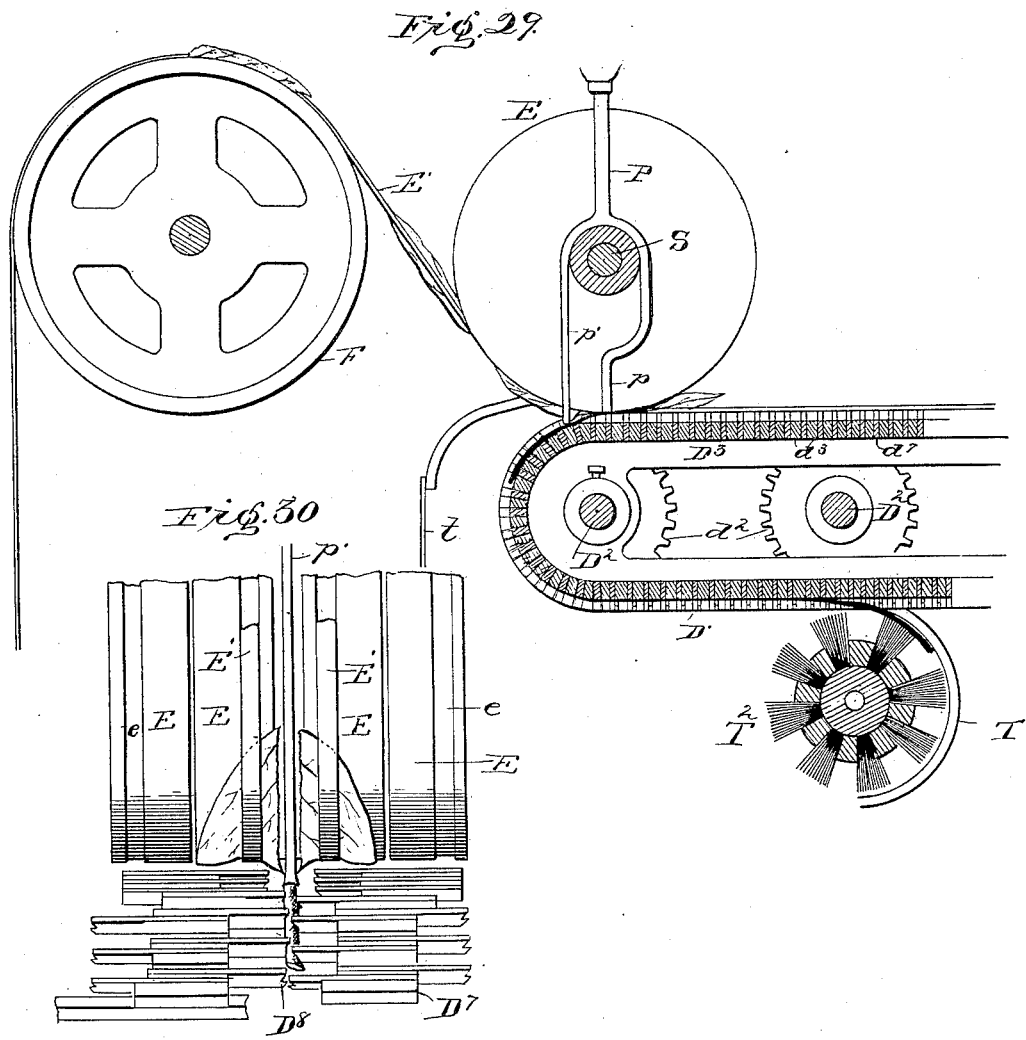

UNITED STATES PATENT OFFICE.

ROBERT W. COFFEE, OF BEDFORD CITY, VIRGINIA, ASSIGNOR TO THE STANDARD TOBACCO STEMMER COMPANY, OF RICHMOND, VIRGINIA.

TOBACCO-STEMMING MACHINE.

SPECIFICATION forming part of Letters Patent No. 599,308, dated February 15, 1898.

Application filed August 1, 1894. Renewed August 6, 1897. Serial No. 647,358. (No model.)

*To all whom it may concern:*

Be it known that I, ROBERT W. COFFEE, of Bedford City, in the county of Bedford and State of Virginia, have invented certain new and useful Improvements in Tobacco-Stemming Machines; and I do hereby declare the following to be a full, clear, and exact description of the same, reference being had to the accompanying drawings, forming a part of this specification, and to the letters of reference marked thereon.

My present invention relates to a new and improved machine for automatically feeding tobacco-leaves and removing the stems from the leaf portion, an operation known as "stemming;" and it involves new principles and modes of operation, having special reference to the feeding and the stemming operations.

Automatic stemmers as heretofore generally constructed may be divided into three classes, depending upon the principle or mode of operation by which the stemming is effected. One class is represented in the machine described in my Patent No. 548,961, dated October 29, 1895, in which the leaf portion and the stem are each positively grasped and held, the first between belts or traveling surfaces and the second by grippers, the two holding devices being moved on diverging lines, so that the leaf will be torn or stripped from the stem in simulation of the hand-stemming operation. In connection with said machine an automatic feeder is employed provided with means for periodically removing the topmost from a pile of leaves and advancing it into position to be engaged by the leaf-holding devices or belts, by which the leaf is carried to the grippers, the stem inserted and engaged by the latter, and the stripping of the leaf from the stem effected. Another and different principle is disclosed in my Patent No. 445,637, wherein the leaves are fed from the top of the pile and are received between feed-belts, where they are held and advanced by frictional contact and subsequently delivered to the stemming mechanism, similar to that of the preceding machine in so far as the stem-gripping device is concerned; but instead of grasping and carrying the leaf between two moving surfaces it is merely held against a traveling surface or surfaces, and instead of tearing or stripping the leaf from the stem the separation is effected by means of a cutter, which operates in proximity to the grippers and cuts the leaf portion adjacent the stem. The third type or class is illustrated in my Patent No. 446,811. In this machine the feeding is from the top of the pile of leaves. The latter are advanced to the stemming mechanism between traveling surfaces, and the stemming is effected by a knife, as in the last-mentioned machine; but instead of employing grippers to carry the leaf toward and past the cutter the leaf is confined between the traveling surfaces and the stem caused to protrude laterally beyond the plane of the cutter.

The present machine differs in principle and mode of operation from the foregoing in several essential particulars, both as to the feeder and the stemming mechanism, and adds a new feature—*i. e.*, the cleaning of the stems by the removal of those small particles of leaf which sometimes remain attached to the stem after passing the stemming mechanism proper.

The new machine includes four principal elements—to wit, the automatic feeder, the leaf-carrier, the stemming mechanism, and the stem-cleaner—each of said devices being complete and operative to perform its designated function and capable of useful application in connection with other and different forms of mechanism, but all combined in the present instance to form a complete tobacco-stemmer, by which the leaves are successively separated from the pile and delivered one at a time to the leaf-carrier, the latter conducting the leaf to the stemmer, and after the stem has been removed and separated from the leaf portion carrying the stem to the cleaner. One of the distinguishing features of the feeding mechanism is its arrangement at the bottom instead of the top of the hopper or receptacle for the leaves, whereby the weight of the superincumbent leaves is utilized both in promoting the introduction of the stems into the feeder and assisting in straightening out the leaves as they are drawn from the receptacle by the carrier. The carrier as compared with those of the prior machines positively engages the stem of the leaf as it is delivered by the feeder.

The stemming mechanism introduces a new principle and differs in its mode of operation from the prior structures in that instead of pulling or cutting the stem from the leaf portion the leaf is firmly clamped and held on opposite sides of the stem and the latter is pushed and forced transversely or to one side by a rapidly-reciprocating pusher, which engages the stem at successively-different points in its length and forces it transversely beyond the plane of the leaf-holding devices, thus breaking the connection between the leaf and stem close to the latter. One great advantage obtained by the pushing as distinguished from the pulling or stripping action of the machine described in my prior application is that broken stems can be removed with greater certainty because the pressure is exerted directly upon the portion of the stem which is to be detached instead of being transmitted through the stem by a pulling motion.

The stem-cleaning attachment is believed to be new in connection with a machine of this kind and is designed to operate upon the stems after they have been separated from the leaf portion for removing the fragments of leaf which may remain attached to the stems after they have passed through the stemming operation.

The machine as a whole and as to its essential elements or parts will first be described, and the novel features pointed out in the claims.

Figure 2:
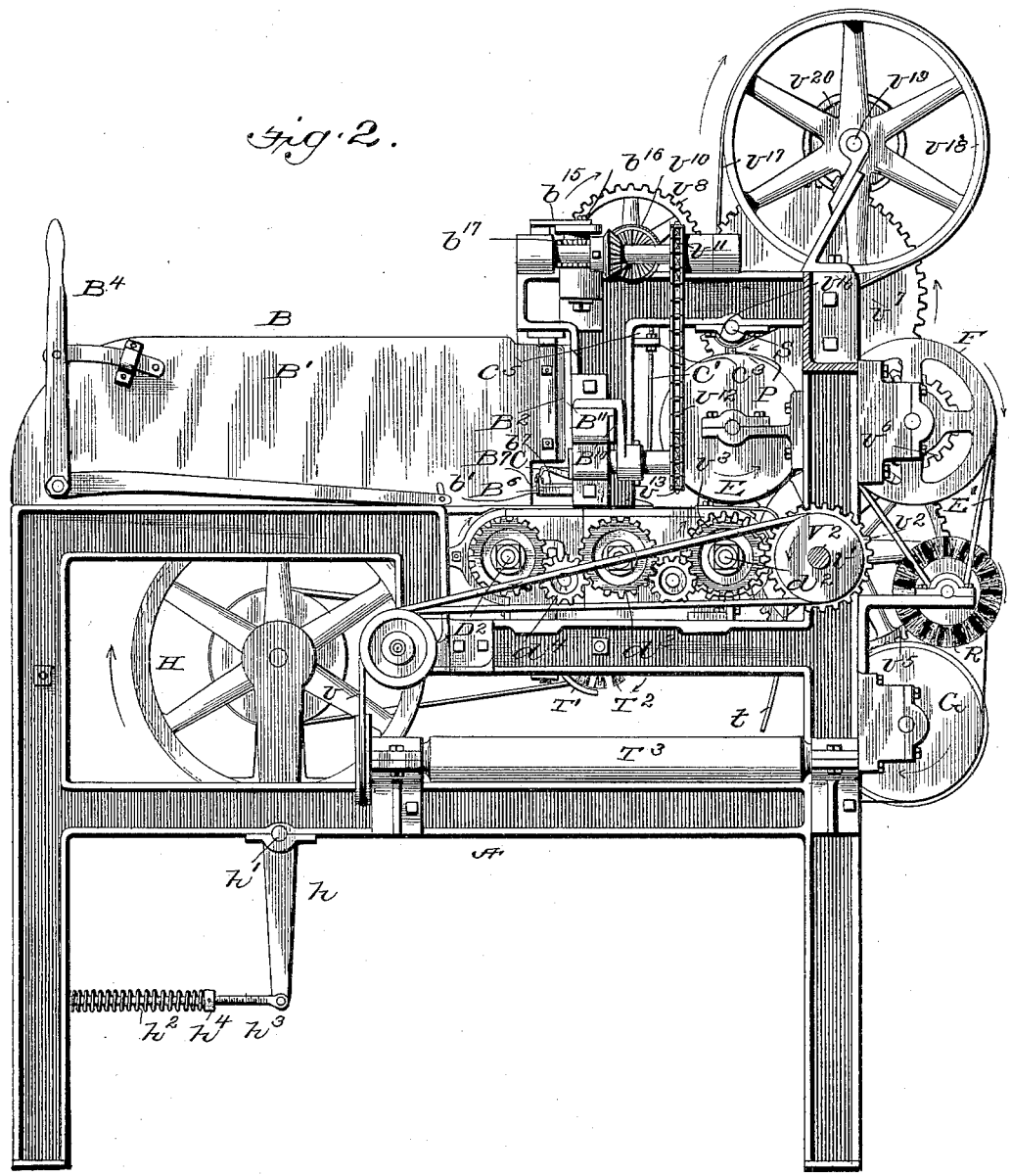
Figure 3:
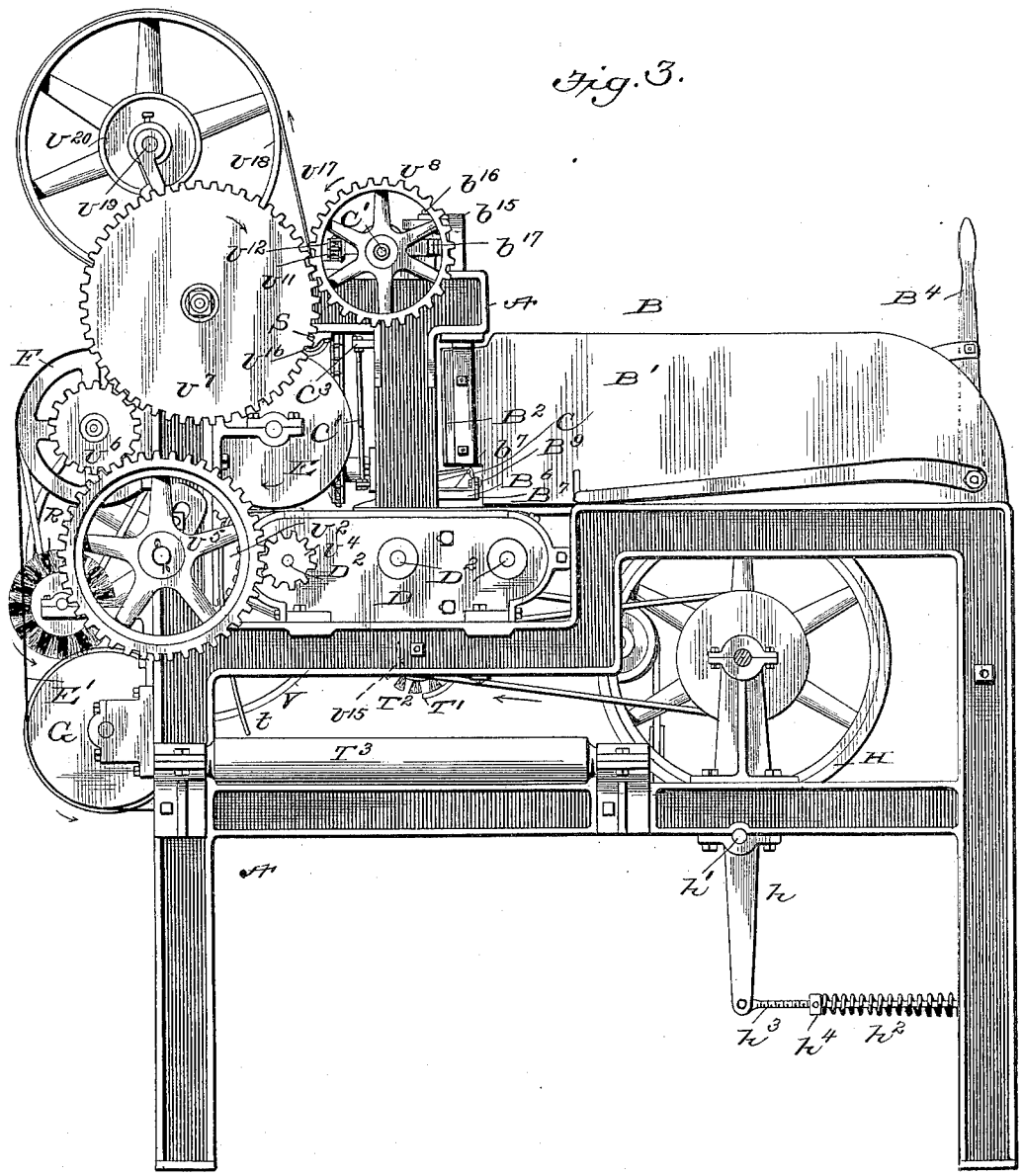
Figure 4:
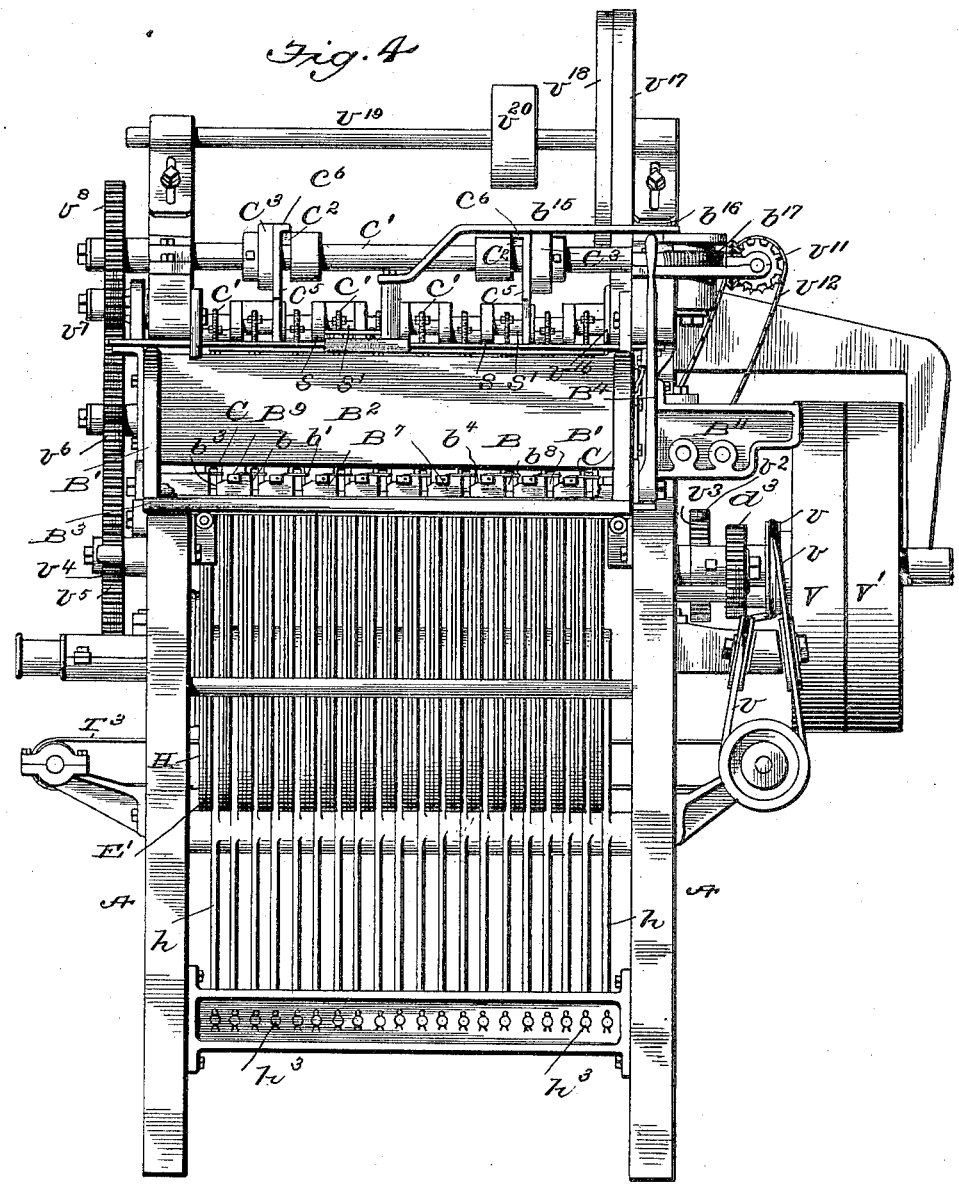
Figure 5:
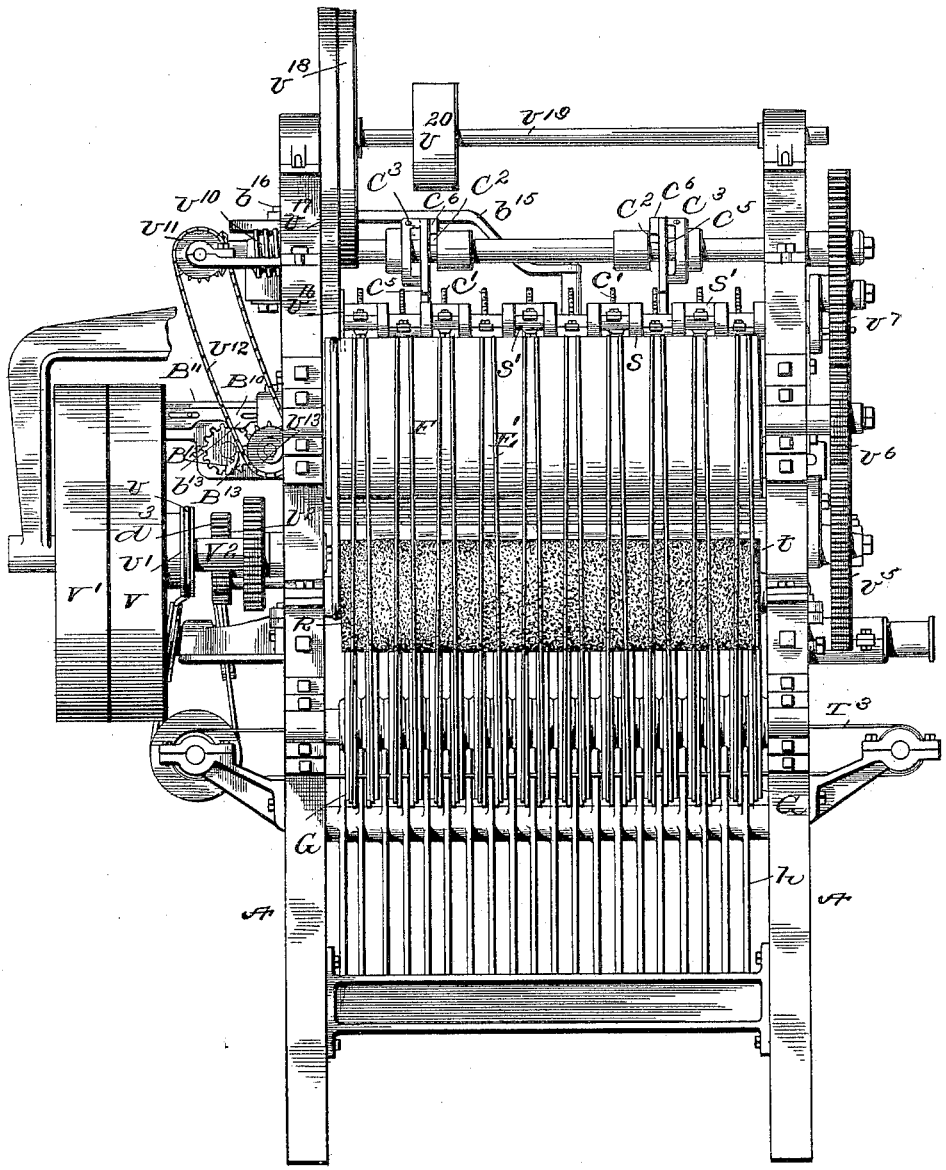
Figure 6:
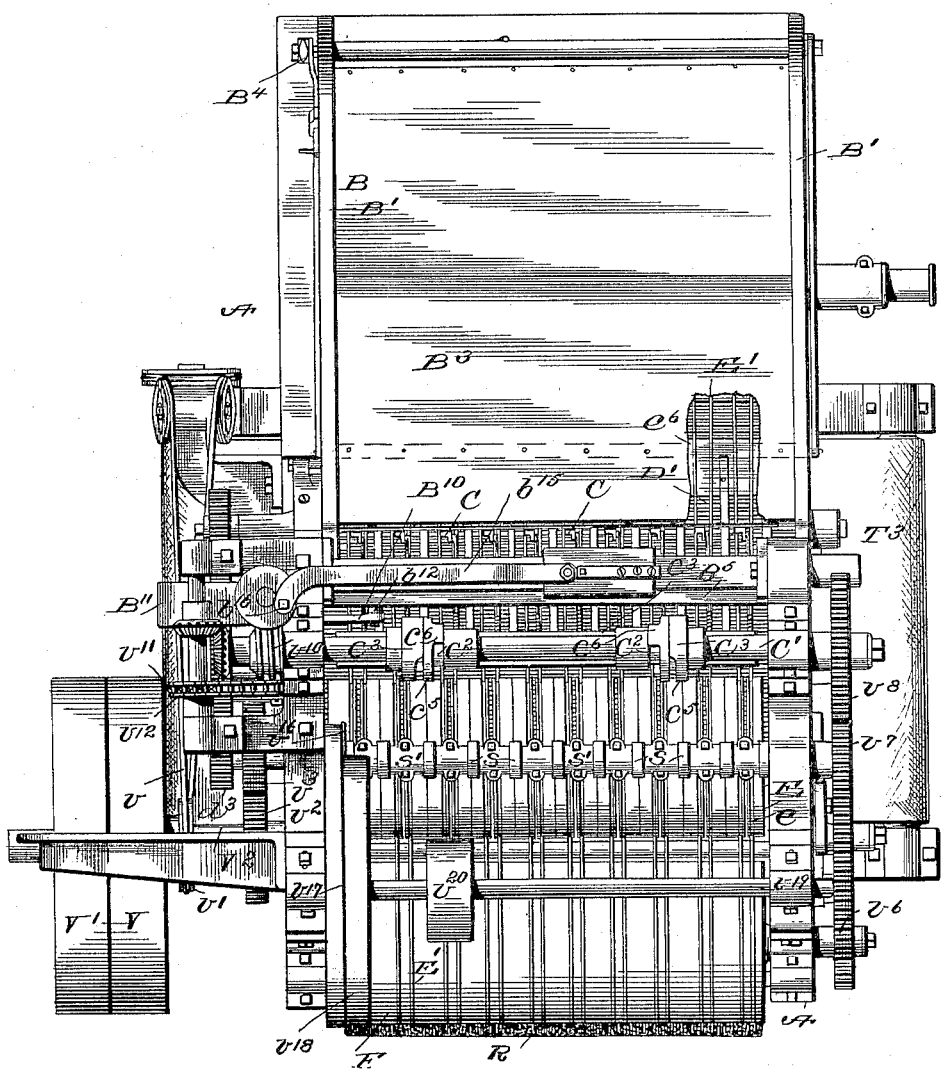

In the drawings, Figure 1 is a view in perspective of the complete machine. Fig. 2 is a right-side elevation. Fig. 3 is a left-side elevation. Fig. 4 is a front elevation. Fig. 5 is a rear elevation. Fig. 6 is a top plan view. Fig. 7 is a longitudinal vertical section through the principal operating parts, the framework being omitted. Fig. 8 is a perspective view of a portion of the feeding mechanism and the transfer-fingers. Fig. 9 is a detail view of one of the cams operating the transfer-fingers. Fig. 10 is a detached view of the actuating devices for the feeder. Figs. 11 to 16, inclusive, illustrate details of the feeder. Fig. 17 is a top elevation of the leaf-carrier, portions being removed to uncover the actuating mechanism. Fig. 18 is a side elevation of one of the guiding and cam frames for the carrier-blades. Figs. 19 to 23, inclusive, are details of the carrier-blades and stem-carriers, showing them in opened and closed positions. Figs. 24 and 25 are detached views of the impaling-points of the carrier. Fig. 26 is a rear view of the leaf and stem carrier, and Fig. 27 represents in plan and elevation the leaf-guides and connections. Fig. 28 is a perspective view of one of the pushers and stem-placers. Fig. 29 is a partial sectional view of the leaf-carrier and stemming mechanism and the stem-cleaner. Fig. 30 is a partial perspective of the delivery side of the stemming mechanism.

Similar letters of reference in the several figures indicate the same parts.

As hereinbefore stated, the machine is composed of four principal elements—to wit, the feeder, the leaf-carrier, the stemmer, and the stem-cleaner, to which may be added as auxiliaries the transfer devices, which effect or insure the removal of the stems from the feeder and their proper location to be engaged by the carrier, and also the stem-carrying devices which engage and hold the stems as they are separated from the leaf portion by the pushers and carry them to the stem-cleaner. A suitable framework and actuating mechanism is of course employed, as will hereinafter appear.

The frame of the machine may be of any approved form or construction suited to the purpose, and in the present instance it is composed principally of the side pieces A A', specially designed for the accommodation of the parts to be described, and connected by cross pieces and rods to form a rigid foundation for the operative parts.

*The feeder.*—The feeding of tobacco-leaves and like articles one at a time from a pile or mass has proved a most difficult operation to perform automatically by machinery. Each leaf is bunched or folded in irregular form, and when a number of such leaves are superimposed and more or less compacted it is very difficult, if not impossible, to so arrange any of the ordinary feed mechanisms that it will operate with any degree of certainty to pick up or separate one leaf at a time from the mass and deliver or present it to another mechanism or device for subsequent treatment. These and other defects and deficiencies I have overcome in my improved feeder, the essential characteristics of which are that it is arranged to operate upon the butt-end or stem of the leaf instead of the leaf portion, as heretofore, and it is arranged beneath or at the bottom of the pile of leaves, so as to engage the lowermost leaf, separate it from the mass, and present it in position to be engaged or received by a carrier or other mechanism.

The feeder proper consists of a channel opening upward for the entrance of the stem and forming a pocket for the reception of a single stem only, a gate for alternately opening and closing the entrance, and an exit, through which the stem is delivered at a point remote from the entrance.

In the form of machine illustrated in the drawings (see Figs. 7 to 16, inclusive) the feeder is arranged within the lower rear corner of the hopper or receptacle B for the leaves. This hopper is preferably composed of side and end pieces B' B² and a bottom or table B³, the rear section being hinged at the front edge and connected to a lever B⁴, Fig. 1, so that by raising the rear edge of said hinged section the pile of leaves can be elevated above the feeder and the feeding interrupted. In rear of the hopper is mounted a cross-bar $B^5$, to which is attached a series of arms $B^6$, projecting horizontally within the hopper and carrying a series of vertically-disposed plates $B^7$. Each plate $B^7$ is provided or formed at one end with a vertical wall or shoulder $b$ and an overhanging projection or wire guard $b'$ at the upper edge, and at the opposite end the upper edge or corner is cut away to form two vertical walls $b^2$ $b^3$ and an intermediate horizontal shoulder $b^4$, the extreme end of the latter being preferably cut away or inclined downwardly. The plates $B^7$ are set at suitable distances apart to form channels $b^8$ of suitable width to accommodate the maximum-size stem, the guard $b'$ of one plate projecting slightly beyond the wall $b^3$ of the next adjacent plate and overlying the shoulder $b^4$. As thus arranged, (see Fig. 8,) a channel or passage $b^8$ is formed between contiguous plates, the entrance to which is between the point of guard $b'$ and the vertical wall $b^2$. At the shoulder $b^4$ the course of the channel or passage is changed to a horizontal direction between said shoulder and the overlying end of the guard $b'$, and finally resumes its vertical course between the walls $b$ and $b^3$.

The cross-bar $B^5$ is provided with guides or ways to receive a horizontally-reciprocating bar $B^8$, to which is secured a series of plates or bars $b^7$, overlying the arms $B^6$ and attached to a series of gates or pushers $B^9$ by bolts passing through guide-slots $b^9$ in the plates $B^7$. Each gate or pusher $B^9$ has its upper surface or edge in substantially the same plane as that of its plate $B^7$ and a range of motion from a point opposite or in rear of wall $b^2$ to a point approximating wall $b^3$. In other words, it moves through substantially the entire length of the horizontal shoulder $b^4$. As thus arranged, the gates or pushers $B^9$ are adapted to perform the two-fold function of gates or cut-offs to close and open the entrances to passages $b^8$ and as pushers for propelling an object through the horizontal portion of the passage or channel and delivering it into the exit.

Horizontal reciprocatory motion may be communicated to the bar $B^8$, and through it to the several gates or pushers $B^9$, by any suitable actuating mechanism, and in Fig. 10 I have illustrated a preferred form for giving a quick positive motion at the proper intervals to adapt it to the present machine.

The bar $B^8$ is furnished with a guiding-bolt $b^{10}$ at one end, working in a slot $b^{11}$ in the cross-bar $B^5$, and the opposite end is similarly guided; but the bolt is attached to an arm $b^{12}$, to which latter is connected one end of a rod or bar $B^{10}$. This bar is guided in a frame $B^{11}$ (see Fig. 10) and is provided upon its under edge with a projection or shoulder $b^{13}$, which is alternately engaged by cams $B^{12}$, secured to gears $B^{13}$, the latter meshing and revolving in opposite directions.

Although I have shown and described a multiple feeder, it is of course to be understood that a single one or any desired number may be employed.

The operation of the feeder or leaf-selector is as follows: The tobacco-leaves are deposited upon the table with the butt-ends of the stems resting upon and overhanging the blades or plates $B^7$, by which they are supported throughout the width of the hopper, excepting in the intervals between the guard $b'$ on one side and the wall $b^2$ on the other—that is, at the entrance to the channel $b^8$. Hence those stems opposite said entrances will drop or be forced down below the points or guards $b'$. The parts are so proportioned and adjusted that but a single average size stem can be accommodated within the mouth of the passage, it being arrested and supported upon the horizontal shoulder $b^4$. When now the bar $B^8$ is shifted to the left, Fig. 10, the pusher $B^9$ will be advanced, closing the entrance to passages $b^8$ and pushing the stems contained therein transversely until they fall into and are delivered through the exits below the plates. The return of the plates uncovers the inlets to the passages and allows another stem to be deposited in each, after which the operations before described are again performed.

It is obvious that unless the stems were guided into the entrances or inlets of the several passages in the feeder or the latter was moved transversely of the platform to present the inlets at different points beneath the pile of leaves the feeding would cease as soon as those stems in position to enter the passages had been withdrawn. Where, however, as in the present case, it is desired that the feeder should maintain a fixed relation to other mechanism, recourse may be had to the expedient of causing the table or hopper to traverse slowly from side to side, to which end it is mounted in guides at the rear end and connected by a pitman $b^{15}$ to a crank $b^{16}$ on a worm-wheel $b^{17}$, Figs. 1, 2, 4, and 6.

It may sometimes happen that the stems will not be discharged by gravity from the passages $b^8$ in the feeder, and to insure their removal, as well as to properly place the stems in the carrier, each feeder is provided with a transfer device in the form of a blade or head C, arranged to reciprocate vertically at proper intervals in the direction of the exit-opening in the feeder and to engage the stem therein, positively forcing the latter from the feeder into the carrier.

The transfer devices C, one for each feeder, are mounted upon levers $c$, pivotally supported in a cross-piece in rear of the feeder and its actuating mechanism, the rear ends of said levers being connected by adjustable rods $c'$ to a vertically-reciprocating cross-head $c^3$.

For a purpose to be hereinafter explained in connection with the carrier the blade or head constituting the transfer devices C stands in a plane substantially at right angles to its lever and is pivoted to the end of the latter, so that its lower edge may be turned or folded back toward the lever. The blade or head is held normally in an upright position by a spring $c^4$, connected thereto and to the lever, as illustrated in Figs. 7 and 12.

It is desired that a quick and positive motion should be given the transfer devices C, the latter standing normally to one side of the entrance of the feed-passage $b^8$ and above the discharge-passage, as indicated in Figs. 8 and 11, when they will not interfere with the entrance of the stems into the feeder, but will be in position above the stems to discharge them from the feeder-passage as the pushers transfer the stems from the inlet to the exit. An actuating mechanism suitable for the purpose is illustrated in the drawings, (see particularly Figs. 8 and 9,) consisting of a rotating shaft $C'$, carrying two sets of cams $C^2 C^3$, each set being arranged to engage projections on one of two uprights $c^5$ on the cross-head $c^3$, said uprights being slotted and embracing the shaft. Cams $C^2$ engage lugs $c^6$ and operate to elevate the cross-head, thereby forcing the transfer devices C down with a quick motion. The weight of the cross-head and its attachments tends to hold the uprights $c^5$ in contact with the shaft, except when elevated by the engagement of cams $C^2$ with lugs $c^6$, and to retract the cross-head when released by the passage of the points of said cams from under the lugs; but to insure the quick return of the transfer devices and to prevent their accidental displacement the cams $C^3$ are provided for engaging a lug or pin $c^7$ on the uprights to force and hold the cross-head down immediately the toes of cam $C^2$ pass from under lugs $c^6$.

*The leaf-carrier.*—The method of selecting and feeding leaves from the bottom of a pile one at a time through the medium of the stems or butts is of special importance and value in that it renders practicable the positive delivery of the leaves to a suitable carrying or grasping device, by which they are drawn from the hopper or table and delivered to other mechanisms. In the present instance the leaves are delivered to a carrier which, traveling rearwardly from the table, grasps the stem of the leaf as presented by the transfer device of the feeder and draws it, butt-end foremost, from beneath the superincumbent pile of leaves, which movement tends to straighten out the leaf and prepare it for subsequent treatment.

It is to facilitate the passage of the leaves that the plates $B^7$ of the feeder are mounted upon the arms $B^6$, projecting within the hopper, thus affording spaces between the arms for the passage of the leaves and the movements of the transfer-levers.

The carrier mechanism of the present machine is organized to perform two distinct offices or functions—*i. e.*, that of taking the leaves from the feeder and subjecting them to the action of the stemming mechanism and that of receiving the stems after they have been removed from the leaf portion by the stemming mechanism and subjecting them to the action of the stem-cleaning devices.

Although in the present instance there are in effect two carriers, they are so related mechanically that they can most conveniently be described together, as they have several elements in common. The details of the carrier are shown in Figs. 7 and 17 to 26, inclusive.

The side pieces A A' of the frame are properly formed for the reception and retention of two guiding-heads D, one on each side of the machine, each provided with a circular or endless guideway or groove $d$ for the reception of a series of bars $D'$ and bearings $d'$ for shafts $D^2$. Three shafts $D^2$ are shown (two or more may be employed) arranged with their axes in the same horizontal plane and each provided with two pinions $d^2$. The three shafts rotate in the same direction, being provided with gears $d^3$ on their ends and connected through idlers $d^4$. (See Fig. 2.) The axes of each end shafts $D^2$ is concentric with the groove $d$ at that end of the guiding-head. The bars constituting the series $D'$ are supported and guided by their ends resting within the grooves $d$ in the opposite guiding-heads. They stand edgewise and completely occupy the grooves $d$, each bar being supported between the next adjacent bars, and the under or inner faces of alternate bars are cut down or properly fashioned to be received between the teeth of the gears or pinions $d^3$.

The series of bars $D'$ constitute in effect an endless flexible rack composed of separate independent bars which are supported and guided in the grooves $d$ and driven by the engagement of the pinions with the inner or under sides of alternate bars.

The arrangement shown insures accuracy of movement with slight friction between the bars, the latter being directly engaged and carried by the teeth of the pinions at the ends over about two-thirds the circumference of said pinions and at the top and bottom of the intermediate pinions. Hence a large proportion of the number of bars are independently driven or carried by the pinions, leaving but a relatively small proportion to be advanced by pressure applied in the rear.

Mounted upon the two end shafts $D^2$ and supported between collars thereon is a cam-frame $D^3$, bearing two sets of cams or guides $d^5 d^{10}$, and within the upper horizontal section of each groove or way $d$ is located a cam $d^6$. The functions of these cams will presently appear.

The bars comprising the series $D'$ are divided into two groups, the one composed of bars $D^5 D^6$, Figs. 21 and 22, belonging exclusively to and constituting the active elements of the leaf-carrier, and the other, composed of the alternate thick and thin bars $D^7 D^8$, forming the stem-carrier.

I will first explain the leaf-carrier proper, composed of adjacent bars $D^5 D^6$. Each bar is formed or provided with a series of transverse grooves or channels, one for each feeder, and one or more toothed sections $d^7$, the teeth whereof project within the groove. One of the bars $D^5$ is shown provided with duplicate sets of teeth, while the other bar $D^6$ has but one set, and in both the upper teeth project slightly beyond the lower, the upper face being substantially horizontal or parallel with the bar, with the under face inclined downwardly from the point. Both bars are cut away, as at $d^8$, to straddle without engaging cam $d^{10}$ on cam-frame $D^3$, and each is furnished with a pin or shoulder $d^9$ for engaging one of the cams $d^5$. Cams $d^6$ are so arranged and adjusted that as the bars $D^5 D^6$ arrive beneath the feeder and the transfer device descends to press the stem down into the groove in said bars the latter will be forced longitudinally, but in opposite directions, to clasp and firmly hold the stem between the teeth on the bars. The upper teeth operate to draw the stem down into the groove, while the lower teeth are designed to penetrate the stem and hold it positively, so that as the bars proceed the leaf will be drawn by its stem from the table or hopper and delivered to the stemming mechanism. It will be noticed that the cams $d^6$ terminate in front of the rear shaft $D^2$ and in advance of the point at which the stemming operation is performed. The pins $d^9$ are engaged by cams $d^5$, which operate to insure the retraction of bars $D^5 D^6$ and the opening of the groove therein preliminary to the insertion of the next succeeding stem.

Turning now to the stem-carrier, it comprises the thick and thin bars $D^7 D^8$, alternating in position, the thicker bars $D^7$ forming teeth in the rack, while the thin bars $D^8$ are cut away, as at $d^{12}$, for the passage of the teeth of pinions $d^2$. Like the bars of the leaf-carrier, the bars $D^7 D^8$ are each provided with a series of transverse grooves or channels— one for each feeder—registering with those in the leaf-carrier bars $D^5 D^6$ when all are retracted. A considerable number of the thicker bars $D^7$ immediately succeeding the leaf-carrier bars are provided with teeth similar to those on the leaf-carriers, while the thinner bars are formed with slightly-beveled or undercut shoulders opposite said teeth. For convenience of construction the teeth of bars $D^7$ are formed on separate plates, which are attached to the bars, as indicated in the drawings.

It is not necessary that all the bars $D^7$ should be provided with teeth, only a sufficient number to form a section of the apron or rack equal to the length of the stem being required.

The bars $D^7 D^8$ are projected in opposite directions to cause the teeth on one series to advance toward the shoulders on the other by the engagement of the walls of a groove $d^{13}$ on the under side of the bar with one of the cams $d^{10}$, a slot $d^{14}$ being formed when the bar passes the opposite cam. The right-hand cam $d^{10}$, Fig. 17, is arranged to actuate the bars $D^8$ and the left-hand cam $d^{10}$ the bars $D^7$. The cams $d^{10}$ are each composed of two straight sections lying in different vertical planes, joined by two inclined sections, of which the upper one $d^{15}$ is located in rear of the rearmost shaft $D^2$, while the lower one $d^{16}$ is below and about opposite the central shaft. It follows from this arrangement that while the bars $D^7 D^8$ are passing from a point beneath the central shaft, around the front shaft, beneath the feeder, and beyond the rear shaft they are held in retracted position, the slots or channels being open. When the converging or inwardly-inclined sections $d^{15}$ are reached, the bars $D^7$ will be moved to the right and bars $D^8$ to the left, thereby closing the channels and retaining them in that condition until the outwardly inclined or diverging sections $d^{16}$ of the cams are reached, when the bars will be retracted to first position. The object and purpose of this arrangement are to provide for the closing of the channels or notches in the carrier and confining the stem therein after the stem has been separated from the leaf portion and as it is discharged from the stemming mechanism, to carry the stem to and discharge it at the cleaner, and to retain the channels open during the carrying forward of the leaf by the leaf-carrier and while it is undergoing the stemming process, as will hereinafter appear.

As hereinbefore stated, the bars $D^5 D^6$ constitute active elements of what is termed the "leaf-carrier," in that they receive and grasp the butt-end of the stem selected by the feeder and, drawing the leaf from the hopper, carry it forward and deliver it between the rolls and belts of the stemming mechanism. The bars $D^7 D^8$ do not take part in this performance, being held retracted until after the stem has been separated by the pusher, when they are advanced to receive and grasp the detached portion of the stem and carry it to the cleaner. (See Figs. 29 and 30.)

*The stemming mechanism.*—The mechanism for effecting the removal of the stems from the leaf portion comprises a series of leaf supporting or carrying belts, (at least two for each feeder,) a roller or rollers between which and the belts the leaf portion is clasped, the stem being guided between the belts, and a pusher reciprocating rapidly and engaging the stem between the belts and operating to force it transversely from between the belts and tear it loose from the leaf portion while firmly clamped and held between the belts and the surface of the roller. Immediately above and in line with the rearmost shaft $D^2$ of the carrier is mounted a shaft supporting a series of narrow rollers E, arranged in pairs, with a slight interval or space between the members of each pair. A circumferential groove $e$ is formed in each roller E, near the edge thereof, for the reception of a belt E'. Each of these belts E', of which there are two for each feeder and leaf-carrier, passes upward from beneath its roller E, Fig. 7, around a drum F, down around a grooved pulley G, thence rearwardly beneath the machine to another grooved pulley H, and from the top of the latter returns to roller E. The drum F is the driver for the series of belts E', which latter are preferably constructed of metal, steel being preferred. Hence in order that they may be made to operate positively and without danger or breakage it has been found desirable to furnish each one with a separate guide-pulley G and tension-pulley H. Each pulley H is mounted in the end of a lever $h$, pivotally supported, as at $h'$, and provided with a tension-spring $h^2$. This spring is supported upon a rod $h^3$, pivoted to the lever $h$ and passing through a cross-piece of the frame, the spring being interposed between said cross-piece and an adjustable nut or collar $h^4$ on the rod. In passing from the top of tension-pulleys H to the bottom of rollers E the belts E' traverse in a horizontal plane beneath the hopper or table (see Fig. 7) and above or upon the surface of the continuous rack composed of the bars forming the leaf and stem carriers. Hence when a leaf is delivered by the feeder into the carrier the butt-end of the stem will be inserted between two adjacent belts, and as the leaf is drawn from the table the butt-end of the stem will be clamped in the carrier below the level of the belts, while the leaf portion will rest upon and be upheld by the belts.

The belts E' do not run in parallel vertical planes throughout their entire course; but the members of each pair approach in passing from the tension-pulleys H to the rollers E, at which latter point they approach most nearly, being guided and supported against lateral displacement by the walls of the grooves in said rollers, and as they pass the drum F they diverge or separate slightly, (see Fig. 5,) being guided by the walls of the grooves in pulleys G. In passing from the tension-pulleys H to rollers E the belts are guided and supported beneath the table or hopper in grooves $e^5$, formed in a cross-piece $e^6$. (See Figs. 7 and 27.) It will thus be seen that the space between adjacent belts is enlarged beneath the feeder, so that the transfer device may properly insert and locate the butt-end of the stem between the clamping-bars of the carrier, after which the belts are brought closer together preliminary to stemming.

As the leaf is taken from the hopper or table it is drawn between guides $e^{10}$, mounted upon arms $e^{11}$ in rear of the feeder, said guides operating to straighten out the leaf and direct the stem in line with the belts and over the space between them. Operating vertically in the space between each pair of rollers E and between the belts E', carried thereby, is a reciprocating plunger or pusher P, by means of which the stem is forced transversely and gradually torn from the leaf portion. Mounted in bearings in the frame above the rollers E is a shaft S, formed or provided with a series of crank-pins or eccentrics and a series of collars or heads $s$. Upon each crank, between adjacent collars $s$, forming guides therefor, is mounted a strap or head $s'$, carrying one of the plungers P. The plunger P is guided in its reciprocatory motion by straddling the shaft of the rollers E, which latter becomes a center of the oscillatory reciprocative movement communicated to it by the crank. At its lower end the plunger is bifurcated or provided with two branches $p\,p'$, of which the front one, $p$, is slightly shorter than the rearmost, $p'$, and preferably has its engaging surface or end slightly concave. The front branch or member $p$ of the plunger has its path of motion intersecting the lower edge of the roller E, and it travels in the space between adjacent rollers and between the belts E', while rear branch $p'$ of the plunger is located beyond the vertical center of the roller E and about opposite the point where the inclined sections $d^{15}$ of cams $d^{10}$ operate upon the bars $D^7\,D^8$ of the stem-carrier to close the channels and grasp the stems. A rotating brush R is arranged intermediate the drum F and pulleys G, with the bristles engaging and projecting between the belts E' to act as a stripper.

The operation of the stemming mechanism is as follows: The butt-end of the stem having been inserted between and grasped by the bars $D^5\,D^6$ of the leaf-carrier the leaf is drawn from the table or hopper and between the leaf-guides $e^{10}$, the leaf portion resting upon the upper surfaces of belts E' and extending above one of the channels in the cam, the stem lying substantially in line with and over the space between the belts, which position it is caused to assume partly by the action of the guides, but mainly owing to the fact that the butt-end of the stem protrudes through the space between the belts and is grasped by the carrier below said belts. As the leaf approaches the rollers and advances beneath the latter the leaf portion enters between the belts and the surface of the rollers, where it is firmly clamped on opposite sides of the stem and held from lateral movement while traveling forward with and between the belts and rollers. The stem is thus presented opposite the space between rollers E, where it is subjected to the action of the rapidly-reciprocating plunger P, the latter operating to force the stem away from the leaf portion and to detach it from the latter. In other words, the leaf being clamped firmly on opposite sides of the stem the plunger pushes successive sections of the stem transversely, the belts presenting edges, against or over which the leaf is torn and separated from the stem. The front branch of the pusher is designed to direct the stem into the space between the belts and prevent it from being caught between the belts and rollers, while the rear branch $p'$ is employed to insure the total separation of the stem from the leaf portion, said branch being given a longer range of motion beyond the belts, inasmuch as it operates beyond the point at which the belts carrying the leaf portion rise above the horizontal, as indicated in Fig. 7. As the stem is being removed by the plunger the leaf portion is carried up between the rollers and belts and is delivered over the drum F, and should it adhere to the belts it will be removed by the brush.

The leaf-carrier has fulfilled its office when it delivers the leaf in position between the belts E' and rollers E, after which the further advance movement is effected by said belts and rollers. Consequently the leaf-carrier is or may be operated to release the stem after it has drawn the leaf so far forward as to insure its entrance between and engagement by the rolls and belts.

*The stem-cleaner.*—The stemming operation is completed as or before the leaf portion passes the rear branch $p'$ of plunger P, and it only remains to carry the stems away and subject them to the action of the cleaner. This operation is performed by the bars $D^7$ $D^8$ of the stem-carrier, said bars being shifted by their engagement with the converging sections $d^{15}$ of the cams $d^{10}$. These inclined sections $d^{15}$ (see Fig. 17) are located in rear of the plunger and beyond the point at which the carrier and belts E' diverge, so that the bars will not be shifted until the stem has been separated from the leaf by the action of the plunger and is forced down into the groove or channel in the carrier. Hence the carrier does not take part in the stemming operation, but merely receives the stems after they have been separated from the leaf portion and, grasping the stem, carries it around with the bars until the latter are retracted by the diverging sections $d^{16}$ of the cams $d^{10}$.

Just beyond the point at which the bars of the stem-carrier are retracted to release the stem a stripper T is arranged to enter the groove in the carrier between the clamping-shoulders, said stripper constituting the entrance to a concave or breast T', into which the stem is delivered and where it is subjected to the action of a rapidly-revolving brush $T^2$, which strips or tears off the small sections of leaf remaining upon the stem, after which they are deposited upon an endless conveyer $T^3$ and delivered to one side of the machine. An apron $t$, Fig. 7, secured to the frame and extending down in rear of the brush, serves to direct the stems and leaf particles onto the conveyer.

The objects had in view in employing a series instead of a single pair of bars for a stem-conveyer are twofold—first, to insure the engagment of the stem in the event one or more pair of bars should pass without obtaining a sufficient grasp to carry the stem to the cleaner, and, second, to insure the engagement of the detached sections of broken stems.

It not infrequently happens that the stem portion of the leaves is broken at one or more points in its length, and in operating machines constructed upon the stripping principle, where both the leaf portion and stem are grasped and pulled apart, such leaves are liable to pass through without being properly stemmed, as the grippers will fail to engage the several sections of the broken stem.

A machine constructed upon the principle herein described will operate as well upon broken as unbroken stems, because each portion is presented to and directly acted upon by the rapidly-reciprocating plunger; but in the case of a broken stem it is necessary that the stem-carrier should be at all times ready to receive the broken sections of stem irrespective of location of the break. Hence by providing a series of bars whose aggregate width equals or exceeds the length of the stem the broken sections as they are forced out by the plunger will be deposited in position to be grasped by one or more pairs of bars, thereby insuring the carrying of broken as well as unbroken stems to the cleaner.

Although, as is obvious, the actuating mechanism for producing the proper movements of the several parts may be varied as to construction and arrangement, the system shown in the drawings has been found suitable for the purpose and may be employed to advantage.

All moving parts of the machine, with the exception of the plungers P and cleaner-brush $T^2$, are connected through a system of gearing, so as to be driven from a single prime mover, (represented by the pulley V,) which, together with a loose pulley V', is mounted upon shaft $V^2$, supported in bearings on the frame.

The conveyer $T^3$ is drawn by a belt $v$, engaging a pulley on one of its supporting-rollers and passing over idlers to a pulley $v'$ on the driving-shaft $V^2$.

The shafts $D^2$ of the carrier receive motion from the driving-shaft $V^2$ through a gear $v^2$ on the latter meshing with a gear $v^3$ on the rearmost shaft $D^2$. The opposite end of the rear shaft $D^2$ carries a pinion $v^4$, meshing with a wheel $v^5$, mounted upon an adjustable support and engaging a pinion $v^6$ on the drum F, through which latter the belts E' are driven. From pinion $v^6$ motion is transmitted through a gear-wheel $v^7$, supported on an adjustable stud, to a gear $v^7$, fixed to one end of the shaft C', extending across the top of the frame and supported in bearings thereon. This shaft C' carries the cams for actuating the transfer devices C and is also provided with a worm $v^{10}$ and a sprocket-wheel $v^{11}$.

The gates and pushers of the feeder receive motion from the sprocket-wheel $v^{11}$, the latter being connected through a chain $v^{12}$ with a sprocket-wheel $v^{13}$ on the shaft of one of the gears $B^{13}$, carrying cams $B^{12}$.

The lateral movement or traverse of the hopper or table is effected by the engagement of worms $v^{10}$ with the worm-wheel $b^{17}$, carrying crank $b^{16}$.

It will be seen that all the elements whose movements have to be timed and proportioned one to the other are connected together and caused to act in harmony, as they have one prime mover in common.

The movements of the plungers P and of the brush T are independent of the other parts of the machine—that is to say, they do not necessarily maintain a fixed relation as to speed. Hence each is arranged to be driven independently. A belt engaging a pulley $v^{15}$ on the shaft carrying the brush T serves to rotate the latter, while the shaft S for actuating the plungers P carries a small pulley $v^{16}$, driven by a belt $v^{17}$, engaging a larger pulley $v^{18}$ on a counter-shaft $v^{19}$, the latter provided with a smaller pulley $v^{20}$, to which the driving-belt is applied.

It is desirable that the speed of the shaft S should be so proportioned to that of the drum F (the driver for the belts) that the plungers or pushers will engage the stem of a leaf at intervals of not less than one-half an inch during its passage between the belts and rollers, the thrust of the plungers being sufficient when applied at such intervals to break the connection between the stem and leaf portion.

Having thus described my invention, what I claim as new is—

1. The hereinbefore-described improved method of stemming tobacco-leaves, consisting in grasping and holding the leaf portion on opposite sides of the stem and forcing the stem transversely by pressure directly applied thereto so as to sever or break the connection between the leaf and stem, as set forth.

2. The hereinbefore-described improved method of stemming tobacco-leaves which consists in clamping the leaves longitudinally on opposite sides of the stem, and forcing the stem transversely from between the clamping-surfaces by the application of pressure applied progressively from one end to the other of the stem.

3. In a machine, such as described, as a means for positively feeding individual leaves, the combination with a receptacle or table for the leaves, of a feeder arranged to engage and select the lowermost from a pile of leaves, substantially as described.

4. The combination with a receptacle or table for the support of a pile of leaves, of a feeder adapted to select the leaves by engagement with the butt-ends of the stems, substantially as described.

5. The combination with a support for the pile of leaves of a feeder arranged to engage the butt-end of the stem and to operate at the base of the pile of superposed leaves; substantially as described.

6. The combination with a leaf-support, of a feeder located beneath the butt-ends of the stems and provided with an opening or channel for the reception of the stems, one at a time, a gate or pusher and a discharge-opening communicating with said first-mentioned opening or channel through which the stems are delivered, successively, by a gate or pusher to carrying or operating devices, substantially as described.

7. The combination with a transversely-movable hopper or table upon which the leaves are supported, of a feeder arranged to support the butt-ends of the stems and operating through the medium of the stems to successively separate the lowermost leaves from the pile; substantially as described.

8. The combination to form an automatic leaf-selector, of a laterally-movable leaf-support and a stationary selector located beyond the leaf portion and beneath the butts of the stems, said selector being provided with devices for engaging the stems and discharging them successively to a carrier or other device, substantially as described.

9. The combination to form an automatic leaf-selector, of a support for the leaf portions, and a selector adapted to support and engage the butt or stem end of the leaf and select the stem of the lowest from those of the superposed leaves; substantially as described.

10. In combination with a selector arranged beneath the butt-ends of the stems and provided with a passage for the stems, and a gate for closing the inlet to the passage; substantially as described.

11. In combination with a selector arranged to receive the butt-ends of the stems and provided with a passage or channel for the stems having its inlet and outlet in different vertical planes, a gate or pusher for closing the inlet and transferring the stem and delivering it at the outlet; substantially as described.

12. The combination with a selector adapted to engage the butt-end of the lowermost of a pile of leaves and separate it from the rest, of a transfer device engaging the stem to eject it from the selector and deliver it, substantially as described.

13. The combination with the hopper, of a selector located within the bottom at or near one end thereof, in position to engage the butts of the leaves, said selector being provided with a passage or channel whose entrance and exit open vertically and are united by a transverse section and a reciprocating plate serving both as a gate and pusher having motion in the plane of the horizontal section of the passage; substantially as described.

14. The combination with a selector constructed and arranged to select leaves from the bottom of a pile by the engagement of the butts, of a vertically-movable support for the leaves by means of which the latter can be held from engagement by the selector; substantially as described.

15. The combination with the hopper of the selector suspended from a bar in rear of the hopper and provided with arms projecting within the hopper and supporting-plates formed and arranged to present a feeding passage or channel between said plates, and a reciprocating gate and pusher coöperating with said plates within the hopper; substantially as described.

16. The combination with a selector substantially such as described, having a connected stem receiving and discharging passage, of a transfer device movable in the plane of the discharge end of the selector-passage, as and for the purpose specified.

17. The combination with a leaf-support and a selector arranged to engage the butts of the stems and to operate upon the stem of the lowermost leaf, a leaf-carrier for receiving and engaging the butt of the leaf discharged from the selector; substantially as described.

18. The combination with a selector engaging the butts of the stems, a transfer device, and a leaf-carrier to which the butts are delivered from the selector by the transfer device; substantially as described.

19. The combination with the leaf-support and a selector operating at the base of the pile of leaves to engage the butt-ends of the stems, of a leaf-carrier provided with a clamp for positively engaging the stem of the leaf as it is delivered from the selector and operating to draw the leaf longitudinally from beneath the superposed leaves; substantially as described.

20. The combination with the hopper or table and the selector located in rear of the table or leaf-support in position to engage the butts of the leaves, of a leaf-carrier to which the butt of the lower leaf is delivered, said leaf-carrier moving rearwardly from the hopper or table, to draw the leaf longitudinally from beneath the superincumbent leaves; substantially as described.

21. The combination with the support for the leaf and a selector located beneath and operating upon the butts of the leaves, of a transfer device, and a leaf-carrier traveling rearwardly from beneath the selector, substantially as described.

22. The combination of a hopper or table, a selector operating upon the butts of the leaves, a leaf-carrier, and a transfer device intermediate the selector and leaf-carrier for transferring the butt of a leaf to the leaf-carrier at the proper intervals, substantially as described.

23. The combination of the hopper, a selector engaging the butts of the leaves in the hopper, a leaf-carrier traversing a circular path beneath the selector, and a transfer device intermediate the selector and leaf-carrier; substantially as described.

24. The combination to form a leaf-carrier, of a series of independent bars, guides supporting the ends of said bars, driving-gears engaging said bars to move them laterally in said guides, and cams operating to shift adjacent bars longitudinally in opposite directions, said bars being provided with channels for the reception of leaf-stems and impaling points or teeth for engaging and holding the stems; substantially as described.

25. The combination to form a carrier such as described, of two series of independent bars lying side by side and supported at the ends in circular grooves or ways on the frame; driving-gears located within the plane of the orbit through which the bars are moved, said gears engaging the bars of one series; cams engaging the bars of each series to shift the two series longitudinally in opposite directions; and engaging or biting shoulders on the bars between which the stem is clamped; substantially as described.

26. In a carrier such as described, the combination with a series of bars provided with clamping devices arranged side by side and supported at opposite ends to move in an elongated circular orbit, the sides whereof are in substantially parallel horizontal planes and the opposite ends arcs; ways on the frame defining the path of said bars; a shaft mounted concentric with the arc formed at each end of the orbits and provided with a pinion engaging said bars to carry them laterally through the orbital path; a frame supported upon the two shafts; and cams engaging adjacent bars to shift them longitudinally in relatively opposite directions, to alternately open and close the clamping devices formed upon or attached to said bars; substantially as described.

27. The combination, to form a stemming mechanism such as described, of a leaf supporting and carrying mechanism comprising two carrying-rollers separated by an interval and a belt engaging each roller, to clamp the leaf on opposite sides of the stem and guide the latter in the belts, and a pusher operating upon the stem portion of the leaf to force the stem from the leaf portion while the latter is held between and advanced by the rollers and belts, substantially as described.

28. In a stemming mechanism, such as described, the combination with the belts and rollers, arranged side by side with an interval between for clamping the leaf on opposite sides of the stem, a pusher reciprocating in the space between adjacent belts and rollers, to engage the stem while the leaf portion is held between the belts and rollers substantially as described.

29. In a stemming mechanism, such as described, the combination with devices for clamping the leaf on opposite sides of the stem, a pusher reciprocating in the space between the two clamps and engaging the stem to force it transversely and break the connection between it and the leaf portion held by said clamps, substantially as described.

30. In a stemming mechanism such as described, the combination of a pair of movable endless clamping devices traveling in parallel planes (such as a pair of belts supported side by side with an interval between them and each partially encircling a roller), adapted to clamp the leaf portion and support the stem between them, and a reciprocating pusher, whose plane of motion is intermediate the said clamping devices, operating to engage successive portions of the stem and force it from the leaf portion held between the clamps; substantially as described.

31. The combination, in a stemming mechanism, of two clamping devices arranged side by side with an interval between them, for engaging the leaf portion on opposite sides of the stem; a pusher engaging the stem between the leaf-clamps, and a leaf-carrier engaging the butt of the leaf and operating to present the leaf to the clamping devices with its stem portion in the space intermediate said clamping devices; substantially as described.

32. The combination with a stemming mechanism provided with a pair of belts and rollers, arranged side by side and adapted to receive and grasp the leaf portion on opposite sides of the stem, and a pusher operating upon the stem in the interval between the belts, of a leaf-carrier engaging the butt of the leaf and advancing the latter in the space between the belts with the leaf portion in position to enter and be grasped between the belts and rollers; substantially as described.

33. The combination with a stemming mechanism, of a selector engaging the butts of the leaves to separate leaves one at a time; and a leaf-carrier engaging the butts as they are delivered by the selector and operating to present the leaf to the stemming mechanism; substantially as described.

34. The combination with a stemming mechanism, of a selector arranged to separate leaves from the bottom of a pile or stack by the engagement of the butt of the lower leaf; a carrier receiving the butts from the selector and drawing the selected leaf longitudinally from beneath the superposed leaves; and guides located on opposite sides of the carrier between which the leaf is drawn by the carrier before being delivered to the stemmer; substantially as described.

35. The combination substantially as herein described, of a butt-feeder, that is one operating upon the butts of leaves to feed them one at a time; a leaf-carrier receiving the leaf butt-end of the stem and moving in a direction to draw the leaf longitudinally from the leaf-support; a pair of belts spaced apart and traveling between the feeder and carrier to receive and support the leaf portion on opposite sides of the stem; two rollers located in different planes between which and the belts the leaf is received and clamped; and a pusher reciprocating in the space between the belts and engaging the stem while the leaf is held by the belts and rollers; substantially as described.

36. The combination substantially as described, of the following elements; a feeder engaging the butt-ends of the stems; a leaf-carrier; a transfer device intermediate the feeder and leaf-carrier, for transferring the stem from the former to the latter; and a stemming mechanism to which the leaf is delivered by the leaf-carrier; as set forth.

37. The combination in a machine, such as described, of the following elements; a hopper; a feeder engaging the butt-ends of the stems at the bottom of the hopper; a stemming mechanism comprising two belts extending side by side horizontally beneath the hopper and partially encircling two rollers located in rear of the hopper with a reciprocating pusher operating between the rollers; and a leaf-carrier, moving horizontally beneath the belts of the stemmer, and provided with clamps for receiving and engaging the stem of a leaf as it is delivered from the feeder between the belts; substantially as described.

38. The combination, in a stemming mechanism, such as described, of the rollers located in different vertical planes with an interval between them provided with peripheral grooves; the metallic belts working in said grooves and serving to clamp the leaf portion therein; and the reciprocating pusher operating upon the stem in the interval between the belts; substantially as described.

39. In a stemming mechanism, such as described, the combination with the belts and rollers spaced apart between which the leaf is grasped on opposite sides of the stem; of the bifurcated pusher reciprocating through the space between the belts; substantially as described.

40. In a stemming mechanism, such as described, the combination with the rollers spaced apart and belts between which the leaf is clamped and the pusher reciprocating between said belts, of the driving-drum, the guide-pulleys and the separate tension-pulleys for the belts; substantially as described.

41. In combination with the carrying and clamping belts and supporting-rollers of the stemming mechanism, and the guiding-pulleys for said belts, the brush mounted in rear of the belts and arranged to project its bristles in front of and beyond the belts, to remove the leaf portion after the stem has been removed, substantially as described.

42. The combination with the stemming mechanism, of a stem-carrier arranged to receive the stems as they are removed by the stemming mechanism and a stem-cleaner to which the stems are delivered for the removal of adhering particles of leaf; substantially as described.

43. In combination with a stemming mechanism consisting of parallel belts and rollers spaced apart, and an intermediate reciprocating pusher engaging the stem; a stem-carrier provided with clamping devices to receive the stem as it is forced transversely from the leaf portion; and a stem-cleaner comprising a brush and a breast or concave into which the stems are discharged by the stem-carrier; substantially as described.

44. The combination in a machine, such as herein described, of the following elements; a feeder; a stemming mechanism; a leaf-carrier intermediate the feeder and stemming mechanism; a stem-cleaner; and a stem-carrier intermediate the stemming mechanism and the stem-cleaner; substantially as described.

45. In a machine, such as described, the combination with the stemming mechanism, of a compound leaf and stem carrier, the same comprising two series of pairs of bars arranged side by side and guided to traverse in a circular path adjacent the stemmer, the bars of one series being reciprocated longitudinally as they approach the stemmer, to clamp the butt-end of a stem, and the bars of the other series being reciprocated longitudinally as they are moving away from the stemmer, to clamp the stem as delivered by the stemmer and carry it to a more remote point when the bars are again reciprocated to discharge the stem; substantially as described.

46. The combination of the leaf-carrier; a transfer device operating to insert the stem of a leaf in said leaf-carrier; two belts spaced apart traveling above said leaf-carrier and supporting the leaf portion; two rollers partially encircled by the belts, to receive the leaf as presented by the leaf-carrier; a pusher reciprocating vertically between the belts and provided with two engaging points or branches; and a stem-carrier provided with clamping-jaws movable beneath the belts and rollers, with mechanism for closing said jaws to grasp the stem as delivered by the rearmost pushing-point, substantially as described.

47. In a machine, such as described, the combination of the following elements; a hopper; a feeder; a leaf-carrier; a transfer device intermediate the feeder and leaf-carrier; a stemming mechanism to which the leaves are delivered by the leaf-carrier; a stem-carrier receiving the stems from the stemming devices; a stem-cleaner receiving the stems from the stem-carrier; and a conveyer onto which the stem-cleaner discharges; substantially as described.

48. The combination with the heads provided with the endless guideways or grooves, the parallel shafts supported within the space inclosed by said grooves and provided with gear-wheels; the cam-frame intermediate the heads; the series of bars supported at opposite ends in said endless guideways and engaged by the gear-wheels on the shafts, said bars being arranged alternately in pairs and provided with a transverse groove with holding-teeth on one series of bars and coöperating shoulders on the opposite series of bars; and cams on the cam-frame engaging the bars to shift them longitudinally at the proper points in their movement; substantially as described.

49. The combination with the series of grooved bars, actuating devices engaging said bars to move them laterally through an orbit; actuating devices for shifting the said bars longitudinally at fixed points in their orbit; and a stripper located within the groove in the bars; substantially as described.

50. In combination with the belts of the stemming mechanism, a leaf-carrier arranged to travel lengthwise of and beneath the said belts, said carrier being provided with toothed sections $d^7$, the upper tooth whereof is beveled on the under side so as to engage a stem inserted between the belts and draw it down within the holding-faces of the carrier; substantially as described.

ROBERT W. COFFEE.

Witnesses:
FRED S. MYERS,
WM. J. PAYNE.